US009533716B2

(12) United States Patent
Stanton

(10) Patent No.: US 9,533,716 B2
(45) Date of Patent: Jan. 3, 2017

(54) FLOOR CONSTRUCTION FOR A VEHICLE

(71) Applicant: Faroex Ltd., Gimili (CA)

(72) Inventor: William H. Stanton, Gimili (CA)

(73) Assignee: Faroex Ltd., Gimili, MB (CA)

( * ) Notice: Subject to any disclaimer, the term of this patent is extended or adjusted under 35 U.S.C. 154(b) by 0 days.

(21) Appl. No.: 14/686,141

(22) Filed: Apr. 14, 2015

(65) Prior Publication Data

US 2016/0304131 A1    Oct. 20, 2016

(51) Int. Cl.
| | |
|---|---|
| *B62D 25/00* | (2006.01) |
| *B62D 25/20* | (2006.01) |
| *B62D 21/03* | (2006.01) |
| *B62D 21/09* | (2006.01) |

(52) U.S. Cl.
CPC ........... *B62D 25/2054* (2013.01); *B62D 21/03* (2013.01); *B62D 21/09* (2013.01)

(58) Field of Classification Search
CPC ...... B62D 25/2054; B62D 21/03; B62D 21/09
USPC .................... 296/178, 193.07, 187.08, 184.1
See application file for complete search history.

(56) References Cited

U.S. PATENT DOCUMENTS

| | | | |
|---|---|---|---|
| 4,224,880 A | 9/1980 | Hogue et al. | |
| 6,375,249 B1 | 4/2002 | Stanton | |
| 7,862,101 B2 * | 1/2011 | Lusk | ................... B60R 16/0207 296/178 |
| 8,066,321 B2 * | 11/2011 | Lusk | ................... B29C 70/443 296/178 |
| 2009/0230729 A1 | 9/2009 | Lusk | |

FOREIGN PATENT DOCUMENTS

| | | |
|---|---|---|
| CN | 203094076 | 7/2013 |
| EP | 0063214 | 2/1982 |
| EP | 1942039 | 9/2008 |
| WO | WO2004000633 | 12/2003 |

* cited by examiner

*Primary Examiner* — Joseph D Pape
(74) *Attorney, Agent, or Firm* — Adrian D. Battison; Ade & Company Inc.

(57) ABSTRACT

A vehicle having a bottom frame including a plurality of rails includes a floor structure defined by a plurality of longitudinally extending flooring planks extending along at least part of the length of the vehicle body and arranged side by side at a coupling rail or overlapping joint so as to collectively span between the side walls. The planks are molded for example by pultrusion or vacuum resin infusion from a composite having an upper skin and a lower skin and an intervening core material layer. The planks can be easily provided at required different lengths including a center and side planks installed while standing on the center plank. The planks can be trimmed to any length for vehicles of varying lengths.

23 Claims, 8 Drawing Sheets

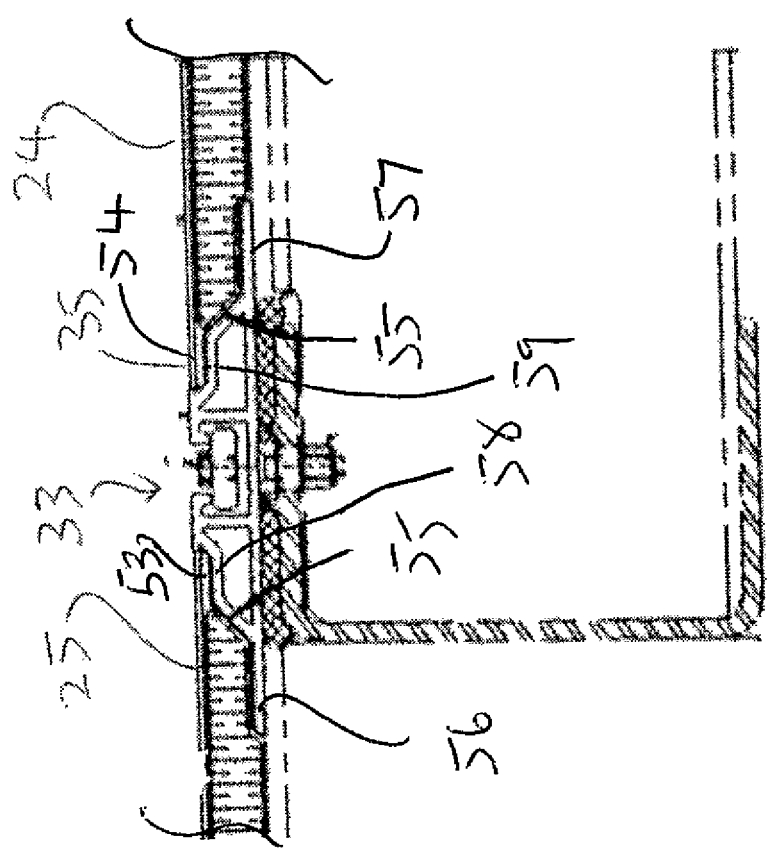

FLOOR CONSTRUCTION FOR A VEHICLE

This invention relates to a floor construction for a vehicle particularly but not exclusively of the type which carries passengers standing or seated, such as a light rail or road transit vehicle and including other vehicles used for commercial transportation of passengers, such as a road transit vehicle, airport and hotel shuttles, converted van and truck cutaways, heavy passenger rail and light rail.

BACKGROUND OF THE INVENTION

Conventionally mass transit vehicles and particularly city buses are manufactured from a welded steel frame defining a floor frame, side wall frame and roof bows which is then clad using sheet cladding material riveted, glued or otherwise fixed to the frame. Insulation material is inserted between the frame members inside the exterior cladding and outside of the interior cladding.

The flooring is conventionally applied from individual simple rectangular panels which are arranged to span across the floor frame and fastened to the floor frame by conventional fasteners. The panels are arranged with butting side edges edge to edge along the vehicle. The floor panels are often fabricated from plywood but however composite materials are also sometimes used including flooring panels manufactured from fibre reinforced plastics material. One particular panel is manufactured from top and bottom sheets of a fibrous mat applied on top and bottom surfaces of a honeycomb material manufactured from phenolic resin impregnated paper with a thermosetting foam introduced into the honeycomb cores.

However the panels are formed, they are conventionally rectangular and arranged edge to edge and cut to shape and to size to complete the necessary flooring overlay.

It is also proposed to manufacture bus structures from fibre reinforced composite plastics material so that the side walls, roof structure and floor are each formed separately from such composite materials and are attached together to form the complete bus structure without the necessity for an additional frame supporting the structure.

U.S. Pat. No. 6,375,249 (Stanton) issued Apr. 23, 2002 discloses a public transit vehicle which has a vehicle body having a roof defining an interior ceiling surface, two side walls each extending longitudinally of the vehicle including an upper side wall portion connecting to the roof and a row of windows underneath the upper portion, a central aisle and two rows of seats each on a respective side of the aisle and along the side wall at the windows. The roof and floor are formed from a welded frame structure over which is applied a molded panel formed in single panel structure and bonded to the frame structure. The panel is formed by molding a sandwich using a thermosetting resin through top and bottom fiber reinforced sheets and a honeycomb layer of resin impregnated paper and foam between the sheets. The floor panel is shaped so that its thickness varies and its top and bottom surfaces deviate from an otherwise planar structure to incline downwardly at a door way and to incline upwardly to clear structural elements.

U.S. Pat. No. 8,006,321 (Lusk) issued Nov. 29, 2011 discloses a structural shear panel for forming a floor panel for formed by a composite of top and bottom sheets and a core with a vacuum infused resin. The panel is mainly planar and terminates at its side edges at a portion which lies in a common plane and portions are provided which are deformed out of the generally planar shape to form depending or elevated sections. The structure is formed by resin infusion into the sheets and core on a generally flat plate defining the planar panel portion with removable sections to define the depending and elevated sections. Edge pieces are attached to the plate to define the edges of the panel.

SUMMARY OF THE INVENTION

It is one object of the present invention, therefore, to provide an improved floor structure for a vehicle.

According to the invention there is provided a vehicle comprising:
a vehicle body having:
a roof,
two side walls each extending longitudinally of the vehicle,
a vehicle floor;
a bottom frame including a plurality of rails supporting the floor;
two side frames each including a plurality of upstanding posts and a plurality of longitudinally extending members interconnecting the posts;
wherein the vehicle floor comprises:
a plurality of longitudinally extending flooring planks each extending along at least part of the length of the vehicle body;
the planks being arranged side by side so as to collectively span between the side walls;
the planks being molded from a composite panel having an upper skin and a lower skin each including reinforcing fibers and an intervening core material layer and containing a cured resin material.

Preferably the planks are formed solely by one center plank and two side planks. These are preferably in many cases of different lengths so that he center plank extends along a greater extent for example the whole length of the floor area and the side planks are typically shorter and are cut off at specific locations for example wheel arches.

The invention is therefore also directed to the kit of parts defined by this set of planks which are pre-cut to the required lengths. This system allows pre-formed and pre-cut planks to be manufactured at relatively low cost and supplied to be assembled into the floor at the vehicle manufacturing plant. This avoids the necessity in the prior art to manufacture a whole floor in one piece which requires expensive tooling and difficult handling techniques.

The invention thus provides a new concept for structural composite flooring for commercial vehicles. The flooring is lightweight, high strength, and is supplied in pultruded or vacuum-assisted resin transfer molded (VARTM) planks in long lengths up to for example a maximum length of 45 feet. The key benefit is that unlike the unitized composite flooring currently manufactured in the prior art, the plank flooring is easier to handle and install. That is the flooring can be installed in relative ease by, for example a 4'×28'×¾" centre plank down the length of the bus (or passenger rail car) chassis, and then installing the side planks whilst standing on the centre plank. A further and very meaningful benefit is that the planks can be trimmed to any length, facilitating the manufacture of buses and rail cars of varying lengths without additional tooling penalties. This is not true for the prior art arrangements of a single panel flooring. The planks interface along an optional, longitudinal seat rail profile which is mechanically attached to a longitudinal beam which makes up part of the vehicle's chassis. The planks are bonded to the seat rail. In cases where the passenger seats are cantilevered off the side wall of the vehicle (thus requiring no seat rail in the floor), the seat rail is omitted. The planks are then reversed so that longitudinal flanges at the edges of the planks overlap, creating a leak-proof, structural joint.

Preferably the center plank has a width to form a central aisle along which passengers can walk between the seats.

Preferably the center plank has a width spanning a distance between two of said longitudinal rails.

Preferably the floor frame is formed by two inner rails and two outer rails at the side edges and wherein the center plank spans the space between the inner rails and two side planks span the space between the inner rails and the outer rail where the center plank connects to the side planks at the inner rails. This can be at an overlap joint or may include a longitudinal support rail for supporting a seat frame member.

In many cases the floor also may include at least one molded section extending across the floor at a position along the length of the floor against which an end of the planks abuts. The molded sections can include a front molded section and intermediate molded section for the floor of the vehicle which supplement the planks to define the full floor structure.

In the case where the floor includes a first wheel arch at one side wall for covering a first wheel and a second wheel arch at a second side wall for covering a second wheel the center plank of the planks can extend between the wheel arches and the two side planks terminate at the wheel arches.

The planks can be formed using different processes but typically will be arranged so that the planks are of constant thickness along their length and across their width. In one process, the planks are formed by pultrusion. In another alternative process the planks are formed by a vacuum infused resin process on a mold where the planks are formed simultaneously side by side on the mold.

In both processes the planks can be formed either by pultrusion or on the mold with side edges of part of reduced thickness to allow the formation of an overlap joint during assembly. Preferably in the molding process the planks are formed as a common structure with the upper and lower sheets joined together at side edges to allow cutting through the sheets at right angles at the side edges to separate the planks to define the three (or more) separate planks for separate transport and installation for subsequent assembly in place.

In some cases a part of the core can be formed of a material of higher density than other parts which can be used for mounting of components to be connected to the floor such as stanchions where the base of the stanchion is connected to the floor by self-tapping screws threaded directly into the high density material or through the higher density core portion to a tapping plate bonded underneath the floor plank.

Preferably an outer edge part of each of the side planks is formed of a material of higher density than other parts to allow cutting of the plank around side posts of the frame. This allows the plank to be cut thus penetrating the upper and lower sheets to the core whilst preventing the capillary intrusion of water into the core due to the use of the higher density non-absorbent core portion.

In a particularly important arrangement for low floor transit vehicles, the floor includes a front lower deck extending from a position adjacent a front wall to a transverse step and a rear upper deck extending from the transverse step to a rear wall with the transverse step between the decks, the front deck being formed from a first set of planks and the rear deck being formed from a second set of planks with a molded step section forming said transverse step therebetween. In this case the front lower deck may include a downwardly inclined molded portion at a forward end thereof against which a front end of the planks abuts.

Preferably the bottom frame includes two longitudinal side rails and a plurality of transverse rails and the underside of the planks is attached to the rails of the bottom frame by adhesive.

The invention also provides a method of manufacturing a floor for a vehicle where the planks as defined above are pultruded, cut to length and installed side by side in the vehicle.

The invention also provides a method of manufacturing a floor for a vehicle where the planks as defined above are molded side by side by a resin infusion system on a mold and are cut to length and installed side by side in the vehicle.

BRIEF DESCRIPTION OF THE DRAWINGS

One embodiment of the invention will now be described in conjunction with the accompanying drawings in which:

FIG. 8 is a cross-sectional view along the lines 8-8 of FIG. 3.

In the drawings like characters of reference indicate corresponding parts in the different figures.

DETAILED DESCRIPTION

Figure 1:
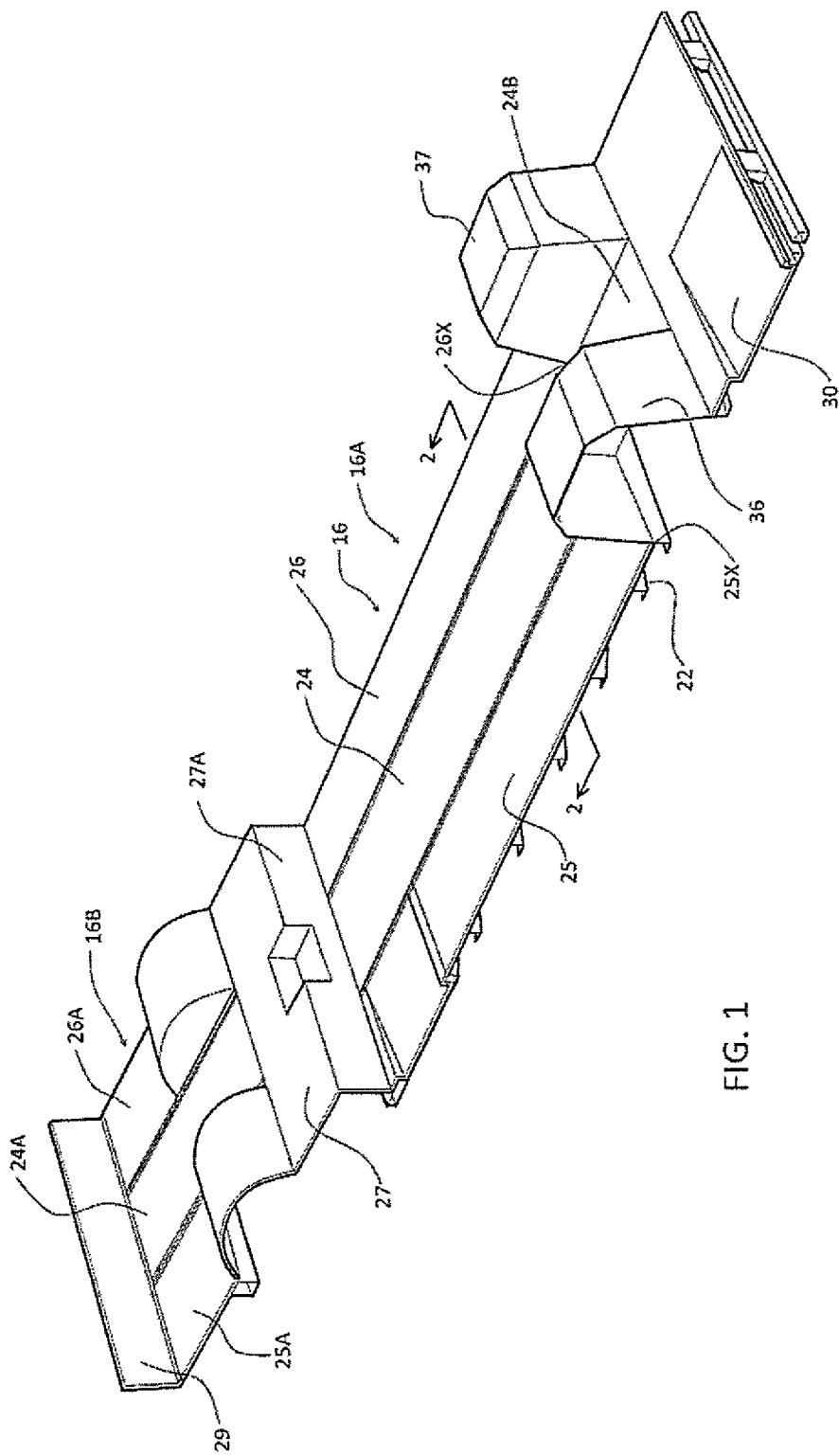
FIG. 1 is an isometric view of a floor of a transit vehicle with the remaining structure of the vehicle omitted for convenience of illustration, the floor planks being designed for connection side by side at a coupling which supports a seat rail.

The vehicle of the present invention can be of various different configurations and structures but generally includes a vehicle body 10 having a roof 11 two side walls 12, 13 typically including windows each extending longitudinally of the vehicle, seating rows 14 and 15 and a vehicle floor 16.

The vehicle side walls and roof typically are formed from a frame including posts 17 and longitudinal rails 17A clad by suitable materials, often aluminum panels.

The floor 16 has a bottom frame including a plurality of rails 18, 19, 20 and 21 with welded cross members 22 supporting a planar floor structure 23.

The vehicle floor structure on top of the frame comprises three longitudinally extending flooring planks 24, 25 and 26 each extending along at least part of the length of the vehicle body. The planks are arranged side by side so as to collectively span between the side walls 12 and 13. In the example shown, the floor includes only the three planks defined by a center plank 24 and two side planks 25 and 26 of different lengths relative to the center plank 24.

In the example of the low floor transit bus shown, the floor includes a front lower deck 16A extending from a position adjacent a front wall to a transverse step 27 and a rear upper deck 16B extending from the transverse step 27 to a rear wall 29 with the transverse step 27 between the decks. In this arrangement the front deck 16A formed from a first set of planks 24, 25 and 26 and the rear deck 16B is elevated over the transmission and rear axle and is formed from a second set of planks 24A, 25A and 26A with the molded step section 27A forming the transverse floor section 27 therebetween. The planks of the lower deck are cut from the same profile as the planks of the upper deck allowing the flooring system to be manufactured easily with constant tooling.

At the front of the lower deck is provided an inclined molded portion 30 defining the entrance area. The vehicle includes a first wheel arch 36 at one side wall for covering a first wheel and a second wheel arch 37 at a second side wall for covering a second wheel and the center plank 24 extends between the wheel arches at a portion 24B while the two side planks 25 and 26 terminate at end edges 25X, 26X the wheel arches.

The floor frame is formed by two inner rails 19 and 20 and two outer rails 18 and 21 at the side edges. The center plank 24 spans the space between the inner rails 19 and 20 and the side plank 26 spans the space between the inner rail 19 and the outer rail 18 and symmetrically the plank 25 spans the space between the inner rail 20 and the outer rail 21. Thus the center plank 24 has a width to form a central aisle along which passengers can walk between the seats and has a width spanning a distance between two of the longitudinal rails 19 and 20. The center plank 24 connects to the side planks 25 and 26 at overlapping joints 31, 32 overlying the inner rails as best shown in FIG. 6.

Figure 2:
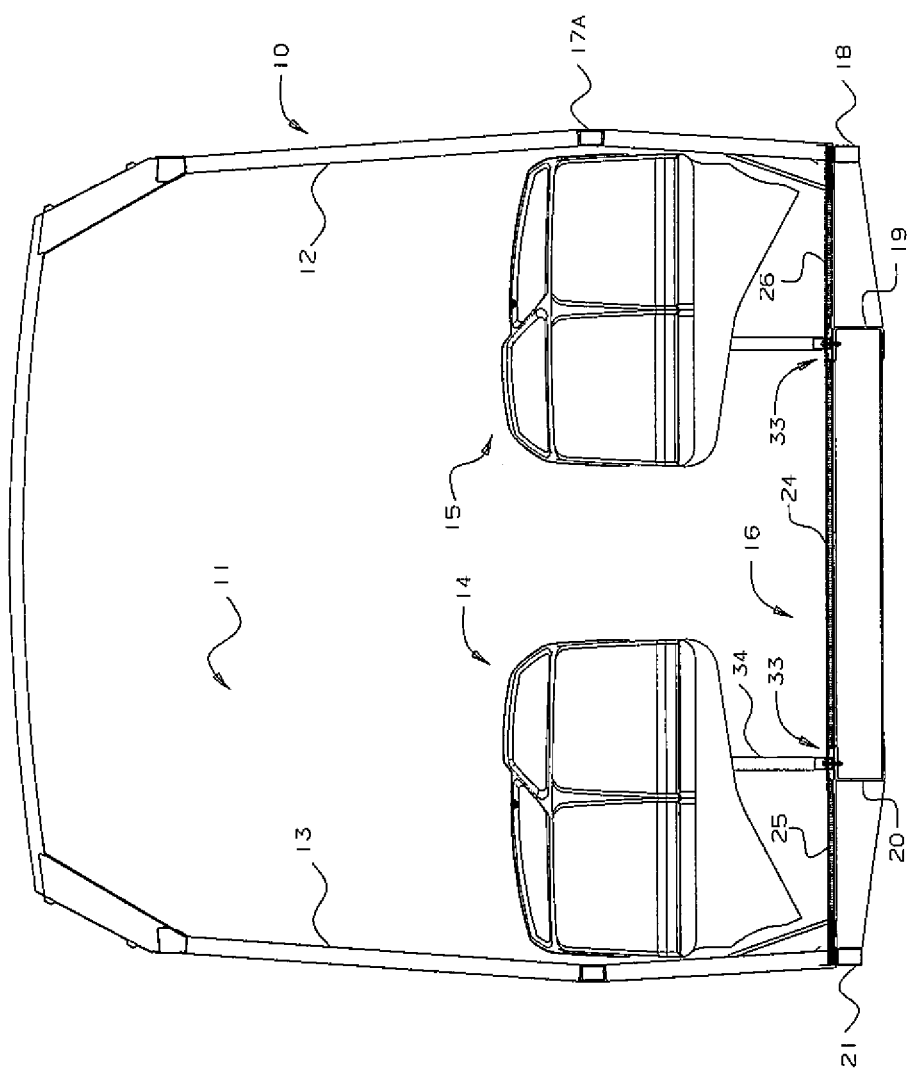
FIG. 2 is a cross-sectional view along the lines 2-2 but also showing the walls, roof and interior seating of the vehicle of FIG. 1.
Figure 3:
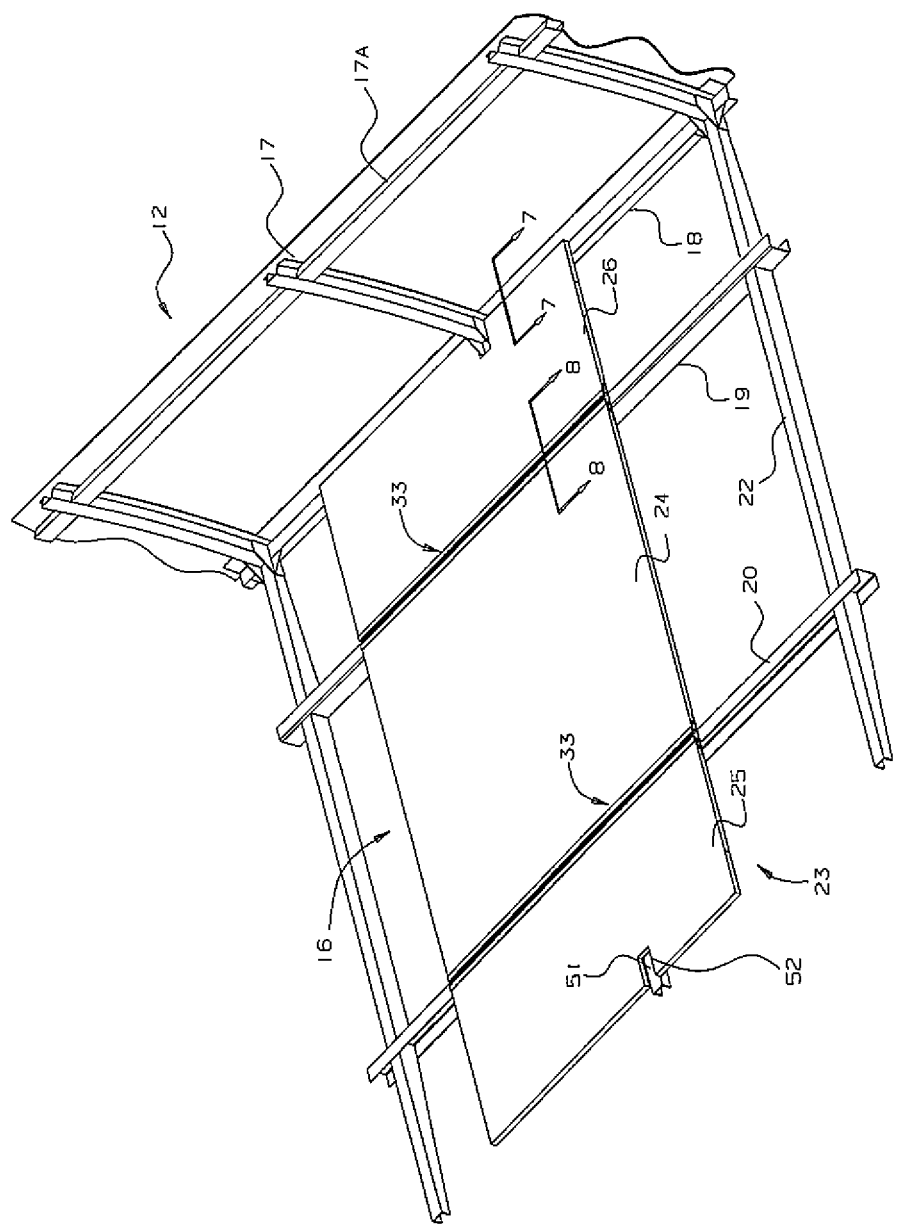
FIG. 3 is an isometric view of part of the floor and part of one wall of the vehicle of FIG. 1.

As shown in the alternative arrangement of FIGS. 2, 3 and 8, the center plank 24 connects to the respective side planks at a joint which includes a longitudinal support rail 33 for supporting a seat frame member 34 of the row of seats 14, 15. In this arrangement the planks include portions 35 which overlie side parts of the rail 33. The planks are attached to the top surface of the underlying rails by adhesive A which also connects the planks at the rail joints.

Figure 6:
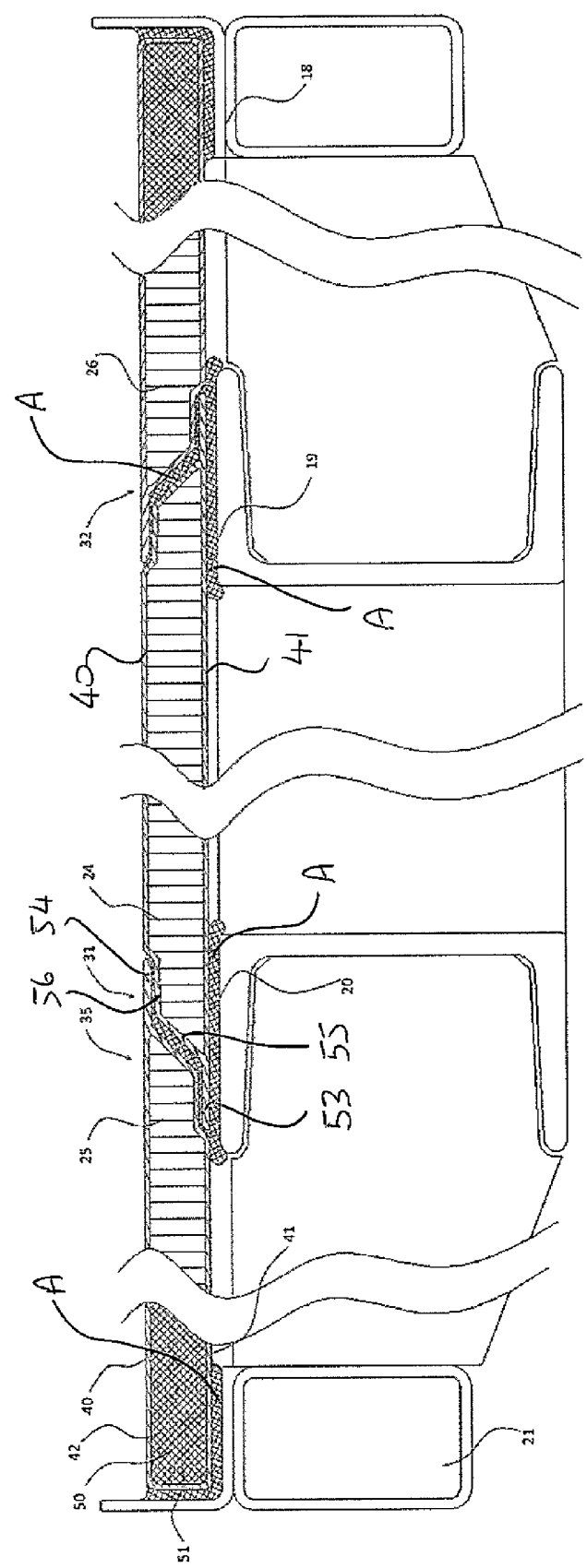
FIG. 6 is a cross-sectional view of the floor planks when removed from the mold of FIG. 4 and assembled without the seat rail coupling into the vehicle of the type shown in FIG. 1.
Figure 7:
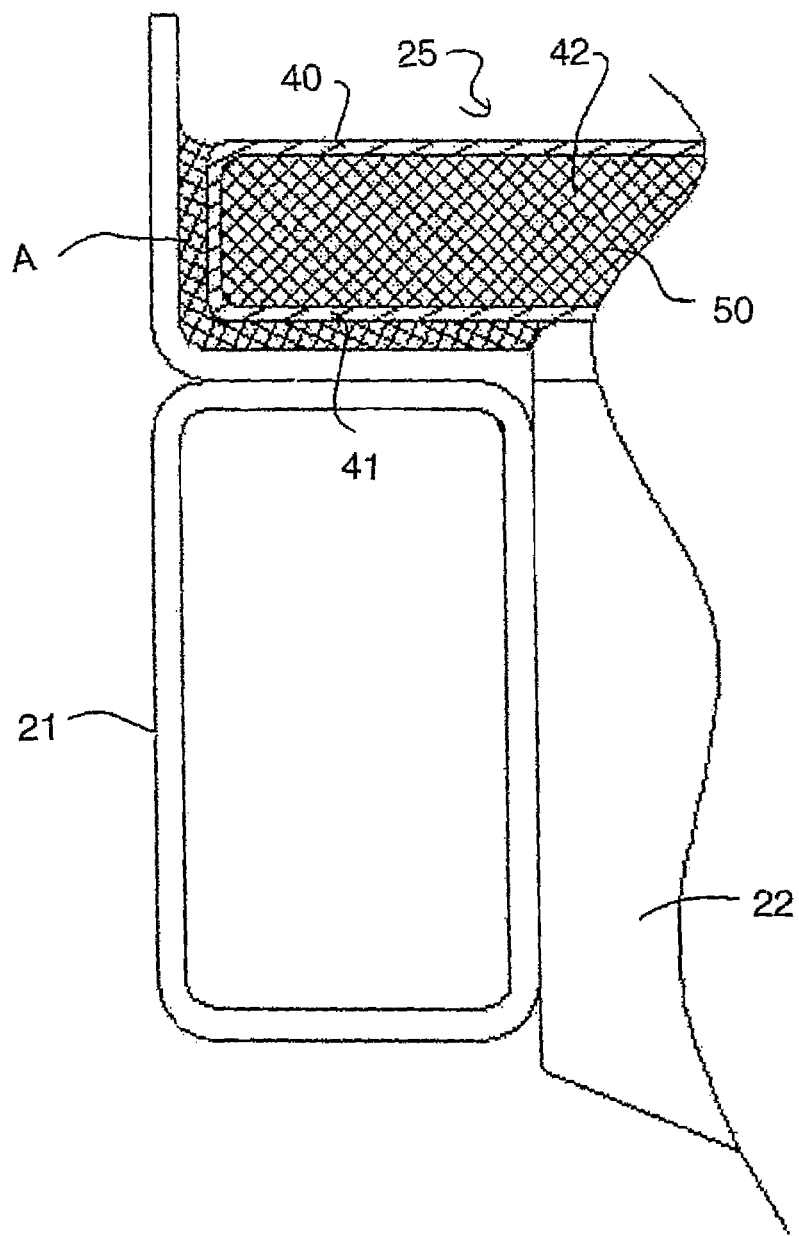
FIG. 7 is a cross-sectional view along the lines 7-7 of FIG. 3.

The planks are molded as shown in FIG. 6 from a composite material having an upper skin 40 and a lower skin 41 of material each including reinforcing fibers and an intervening core material layer 42 all containing a cured resin material. Materials of this type are well known and can be manufactured using different processes. In FIG. 6, the planks including the upper and lower sheets and the core are formed by pultrusion using well known techniques of core and fiber feeding.

Figure 4:
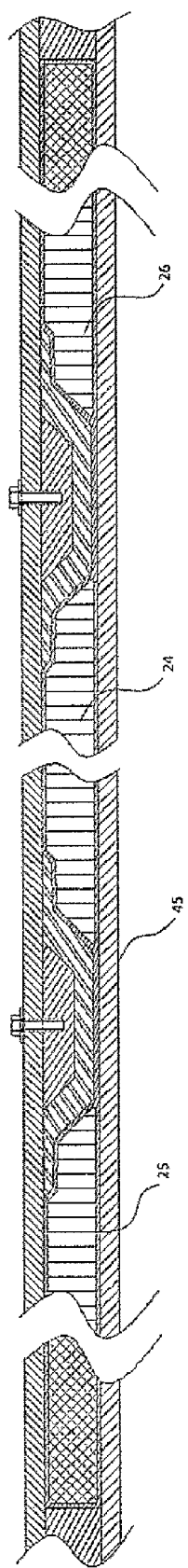
FIG. 4 is a cross-sectional view of a mold for forming the floor planks for a vehicle of the general type shown in FIG. 1.
Figure 5:
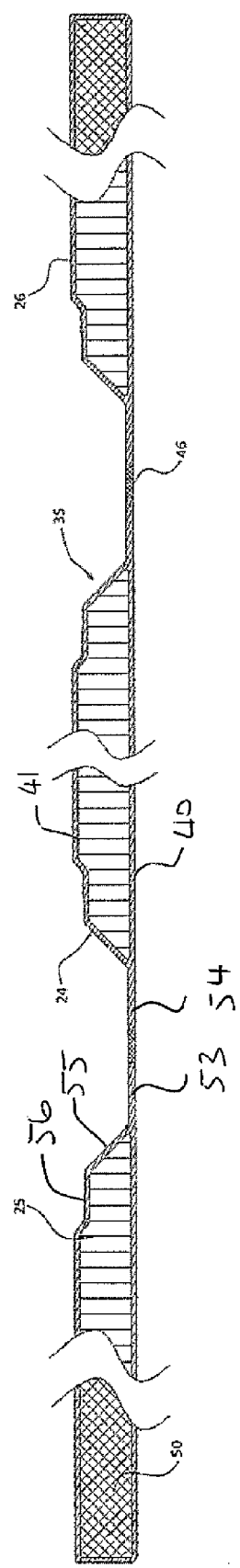
FIG. 5 is a cross-sectional view of the floor planks when removed from the mold of FIG. 4.

In FIGS. 4 and 5, the planks 24, 25 and 26 including the upper and lower sheets and the core are formed by a vacuum infused resin (VARTM) process on a mold 45. Using well known molding techniques, the planks 24, 25 and 26 are formed simultaneously side by side on the mold 45 with side edges 35 of part thickness to allow overlap during the assembly. The molding technique uses movable cores that form the "side edges". These are molded silicone trapezoids with a steel core. They are bolted to the core mold and can be moved laterally to make wider or narrower planks to fit the particular configuration of the vehicle. So for example the spacing between the longitudinal frame members on a hotel shuttle (such as a Mercedes Sprinter) may be more narrowly spaced than a full-width low floor transit bus. The width of the centre panel can be adjusted to the narrower width by moving the silicone inserts. Silicone is used rather than standard, rigid tooling materials so that a seal can be maintained between the core mold surface and the insert, preventing resin from flowing between the insert and the core mold surface, locking the part in the mold.

FIG. 4 shows the VARTM method of forming the planks, which may be used in the exact same manner as the pultruded planks. The configuration shown in FIG. 6 can be either the VARTM planks or the pultruded plank. As shown at 46 in FIG. 5 the planks are formed with joined upper and lower sheets at side edges 35 to allow cutting at the side edges to separate the planks for subsequent assembly in place.

Thus as shown best in FIGS. 5, 6 and 8, the planks are formed with flanges 53 and 54 defined by the joined upper and lower skins 40, 41 with no intervening core. The core is shaped with a reduced thickness portion along the edge of the plank, at 56 so that the skin 41 is recessed by the thickness of the flange 53, 54 allowing a symmetrical overlap joint where the flanges 53 and 54 sit in the recesses defined by the portion 56. The joining edge portion 55 is inclined at an angle of the order of 45 degrees so as to communicate loading between the planks at the overlap joint. As shown in FIG. 8 the same edge shapes including the flanges 53 and 54 are used with the rail 33 which has side flanges 56 and 57 to sit in the recessed portions 55 and has shoulders 58 and 59 to receive the flanges 53, 54. Thus the planks of the same configuration can be used with the joint including the rail or with the overlap joint. The width of the planks may be modified to accommodate the intervention of the rail in FIG. 8.

As shown at 50 a part of the core is formed of a material of higher density than other parts. Thus for example an outer edge part 51 of each of the side planks is formed of a material of higher density than other parts to allow cutting of the side planks at cut-outs 52 around the side posts 17 of the frame as shown in FIG. 3 whilst preventing the capillary intrusion of water.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:
1. A vehicle comprising:
   a vehicle body having:
   a roof,
   a first and a second side wall each extending longitudinally of the vehicle on respective sides of the vehicle body, each including a plurality of upstanding posts and a plurality of longitudinally extending members interconnecting the posts;
   and a vehicle floor;
   wherein the vehicle floor comprises:
   a welded frame structure having a plurality of longitudinal rails and a plurality of transverse rails welded thereto;
   a plurality of longitudinally extending flooring planks each extending along at least part of the length of the vehicle body;
   the planks being arranged side by side so as to collectively span between the side walls;
   the planks each being molded from a composite panel having an upper skin and a lower skin each including reinforcing fibers and an intervening core material layer and containing a cured resin material;

wherein an underside of the planks sits on top of the longitudinal rails and the transverse rails of the frame structure and is attached thereto by adhesive.

2. The vehicle according to claim 1 wherein the planks consist of a center plank and two side planks, wherein the side planks are of different lengths relative to the center plank.

3. The vehicle according to claim 1 wherein the planks include a center plank of the planks which has a width to form a central aisle along which passengers can walk.

4. The vehicle according to claim 1 wherein said plurality of longitudinal rails includes two longitudinal inner rails each spaced from a respective one of two side edges of the vehicle floor and wherein the planks include a center plank of the planks which has a width spanning a distance between said two longitudinal inner rails.

5. The vehicle according to claim 4 wherein said plurality of longitudinal rails includes two outer rails at the side edges of the vehicle floor and wherein said planks include two side planks which are arranged such that each respectively spans a space between the inner rails and the outer rails.

6. The vehicle according to claim 5 wherein the center plank connects to the side planks at the inner rails.

7. The vehicle according to claim 6 wherein the center plank connects to the side planks at an overlap joint.

8. The vehicle according to claim 5 wherein the center plank connects to the side planks at a joint which includes a longitudinal support rail for supporting a seat frame member.

9. The vehicle according to claim 1 wherein the floor includes at least one molded section extending across the floor at a position along the length of the floor against which an end of the planks abut.

10. The vehicle according to claim 1 wherein the planks are formed by pultrusion.

11. The vehicle according to claim 1 wherein the planks are formed by a vacuum infused resin process on a mold.

12. The vehicle according to claim 11 wherein the planks are formed simultaneously side by side.

13. The vehicle according to claim 11 wherein the planks are formed with side edges of part thickness.

14. The vehicle according to claim 11 wherein the planks are formed with the upper and lower skins joined at side edges of the planks.

15. A vehicle comprising:
a vehicle body having:
  a roof,
  a first and a second side wall each extending longitudinally of the vehicle on respective sides of the vehicle body, each including a plurality of upstanding posts and a plurality of longitudinally extending members interconnecting the posts;
  and a vehicle floor;
wherein the vehicle floor comprises:
a welded frame structure having a plurality of longitudinal rails and a plurality of transverse rails welded thereto;
a plurality of longitudinally extending flooring planks each extending along at least part of the length of the vehicle body;
the planks being arranged side by side so as to collectively span between the side walls;
the planks each being molded from a composite panel having an upper skin and a lower skin each including reinforcing fibers and an intervening core material layer and containing a cured resin material;
wherein an underside of the planks sits on top of the longitudinal rails and the transverse rails of the frame structure and is attached thereto by adhesive;
wherein there is provided a first wheel arch at said first side wall for covering a first wheel and a second wheel arch at said second side wall for covering a second wheel;
and wherein the planks include a center plank of the planks which extends between the wheel arches.

16. The vehicle according to claim 15 wherein said planks include two side planks which terminate at the wheel arches.

17. The vehicle according to claim 15 wherein said plurality of longitudinal rails includes two longitudinal inner rails each spaced from a side edge of the vehicle floor and a wherein the planks include a center plank of the planks which has a width spanning a distance between said two longitudinal inner rails.

18. The vehicle according to claim 17 wherein said plurality of longitudinal rails includes two outer rails at the side edges of the vehicle floor and wherein said planks include two side planks which are arranged such that each respectively spans a space between the inner rails and the outer rails.

19. The vehicle according to claim 15 wherein all of the planks, including the upper and lower sheets and the core, are formed simultaneously by a vacuum infused resin process on a mold and separated each from the next.

20. A vehicle comprising:
a vehicle body having:
  a roof,
  a first and a second side wall each extending longitudinally of the vehicle on respective sides of the vehicle body, each including a plurality of upstanding posts and a plurality of longitudinally extending members interconnecting the posts;
  and a vehicle floor;
wherein the vehicle floor comprises:
a welded frame structure having a plurality of longitudinal rails and a plurality of transverse rails welded thereto;
a plurality of longitudinally extending flooring planks each extending along at least part of the length of the vehicle body;
the planks being arranged side by side so as to collectively span between the side walls;
the planks each being molded from a composite panel having an upper skin and a lower skin each including reinforcing fibers and an intervening core material layer and containing a cured resin material;
wherein an underside of the planks sits on top of the longitudinal rails and the transverse rails of the frame structure and is attached thereto by adhesive;
wherein the floor includes a front lower deck extending from a front of the vehicle to a transverse step and a rear upper deck extending from the transverse step to a rear of the vehicle with the transverse step between the decks;
and wherein the front deck is formed from a first set of said plurality of longitudinal planks and the rear deck is formed from a second set of said plurality of longitudinal planks with a molded step section forming said transverse step therebetween.

21. The vehicle according to claim 20 wherein said plurality of longitudinal rails includes two longitudinal inner rails each spaced from a side edge of the vehicle floor and a wherein the planks include a center plank of the planks which has a width spanning a distance between said two longitudinal inner rails.

22. The vehicle according to claim 21 wherein said plurality of longitudinal rails includes two outer rails at the side edges of the vehicle floor and wherein said planks include two side planks which are arranged such that each respectively spans a space between the inner rails and the outer rails.

23. The vehicle according to claim 20 wherein all of the planks, including the upper and lower sheets and the core, are formed simultaneously by a vacuum infused resin process on a mold and separated each from the next.

* * * * *